(12) United States Patent
Elkhatib et al.

(10) Patent No.: US 12,020,702 B2
(45) Date of Patent: Jun. 25, 2024

(54) LOW-POWER MULTI-VOICE ASSISTANTS VOICE ACTIVATION

(71) Applicant: AONDEVICES, INC., Irvine, CA (US)

(72) Inventors: Mouna Elkhatib, Irvine, CA (US); Adil Benyassine, Irvine, CA (US)

(73) Assignee: AONDEVICES, INC., Irvine, CA (US)

( * ) Notice: Subject to any disclaimer, the term of this patent is extended or adjusted under 35 U.S.C. 154(b) by 154 days.

(21) Appl. No.: 17/498,941

(22) Filed: Oct. 12, 2021

(65) Prior Publication Data

US 2022/0115015 A1 Apr. 14, 2022

Related U.S. Application Data

(60) Provisional application No. 63/090,595, filed on Oct. 12, 2020.

(51) Int. Cl.
| | |
|---|---|
| *H04M 1/64* | (2006.01) |
| *G06F 1/3206* | (2019.01) |
| *G10L 15/16* | (2006.01) |
| *G10L 15/22* | (2006.01) |
| *G10L 25/78* | (2013.01) |

(52) U.S. Cl.
CPC ............ *G10L 15/22* (2013.01); *G06F 1/3206* (2013.01); *G10L 15/16* (2013.01); *G10L 25/78* (2013.01); *G10L 2015/223* (2013.01)

(58) Field of Classification Search
CPC ......... G10L 15/22; G10L 15/16; G10L 25/78; G06F 1/3206
See application file for complete search history.

(56) References Cited

U.S. PATENT DOCUMENTS

| | | | | |
|---|---|---|---|---|
| 10,762,896 | B1 * | 9/2020 | Yavagal | .................. G10L 17/00 |
| 10,825,451 | B1 * | 11/2020 | Yavagal | ................ G10L 15/183 |
| 10,854,186 | B1 * | 12/2020 | Devireddy | ........... G10K 11/178 |
| 10,872,599 | B1 * | 12/2020 | Wu | ......................... G10L 15/08 |
| 11,043,218 | B1 * | 6/2021 | Sun | ......................... G10L 25/30 |
| 11,069,353 | B1 * | 7/2021 | Gao | ......................... G10L 25/78 |
| 11,205,420 | B1 * | 12/2021 | Fu | ............................. G06N 3/04 |
| 11,308,939 | B1 * | 4/2022 | Gao | ...................... G10L 15/142 |
| 11,392,401 | B1 * | 7/2022 | Pierce-Durance | .... H04L 67/306 |
| 11,410,684 | B1 * | 8/2022 | Klimkov | ................. G10L 25/78 |
| 11,482,220 | B1 * | 10/2022 | Kosowski | ............... G10L 15/22 |
| 11,495,240 | B1 * | 11/2022 | Pierce-Durance | .... G10L 19/173 |
| 11,514,900 | B1 * | 11/2022 | Yavagal | ................ G10L 15/063 |
| 11,521,599 | B1 * | 12/2022 | Jose | ......................... G06F 17/15 |

(Continued)

*Primary Examiner* — Simon King
(74) *Attorney, Agent, or Firm* — Stetina Brunda Garred & Brucker

(57) ABSTRACT

Systems and methods presented herein generally include multi-wake phrase detection executed on a single device utilizing multiple voice assistants. Systems and methods presented herein can further include continuously running a Voice Activity Detection (VAD) process which detects presence of human speech. The multi-wake phrase detection can activate when the VAD process detects human speech. Once activated, the multi-wake phrase detection can determine which (if any) of the wake phrases of the multiple voice assistants might be in the detected speech. Operation of the multi-wake phrase detection can have a low miss-rate. In some examples, operation of the multi-wake phrase detection can be granular to accomplish the low miss-rates at low power with a tolerance for false positives on wake phrase detection.

20 Claims, 3 Drawing Sheets

(56) References Cited

U.S. PATENT DOCUMENTS

| | | | | |
|---|---|---|---|---|
| 2020/0184966 A1* | 6/2020 | Yavagal | ................. | G10L 15/30 |
| 2020/0184967 A1* | 6/2020 | Gupta | ..................... | G06F 3/167 |
| 2020/0251118 A1* | 8/2020 | Sunkavally | ............. | G10L 17/04 |
| 2021/0020162 A1* | 1/2021 | Griffin | .................. | G10L 15/063 |
| 2021/0174794 A1* | 6/2021 | Mont-Reynaud | ....... | G06F 3/167 |
| 2021/0210099 A1* | 7/2021 | Wander | ................... | G10L 15/32 |
| 2021/0295833 A1* | 9/2021 | Rastrow | ................. | G10L 15/26 |
| 2022/0335937 A1* | 10/2022 | Thomas | .................. | G10L 15/08 |
| 2023/0098174 A1* | 3/2023 | Simes | ................ | G06F 3/04883 |
| | | | | 704/275 |

* cited by examiner

LOW-POWER MULTI-VOICE ASSISTANTS VOICE ACTIVATION

CROSS-REFERENCE TO RELATED APPLICATIONS

This application relates to and claims the benefit of U.S. Provisional Application No. 63/090,595 filed Oct. 12, 2020 and entitled "LOW-POWER MULTI-VOICE ASSISTANTS VOICE ACTIVATION," the disclosure of which is wholly incorporated by reference in its entirety herein.

STATEMENT RE: FEDERALLY SPONSORED RESEARCH/DEVELOPMENT

Not Applicable

BACKGROUND

1. Technical Field

The present disclosure relates generally to human-computer interfaces, and those that are voice-activated. More particularly, the present disclosure relates to low-power multi-voice assistants voice activation.

2. Related Art

Voice activation has become more and more popular with the increase in voice assistants such as Amazon Alexa and Google voice assistants. Such voice assistants are activated by a user speaking a wake phrase such as "Hey Alexa" or "OK Google". A challenge associated with the voice activation in battery-powered devices is keeping the power requirement to detect the wake phrase low. Typical voice assistants include continuously running a Voice Activity Detection (VAD) processes which detects presence of human speech, once speech is detected, activating an on-device processor to run an analysis of the speech to determine whether the speech includes the wake phrase, and once the wake phrase is detected, sending an interrupt to the rest of the system (i.e the application processor) for wake-up and launching data streaming to the cloud. Voice assistants having a single wake phrase search for the single wake phrase once the VAD detects presence of human speech. Voice assistants having multiple wake phrases search for any of the wake phrases once the VAD detects presence of human speech, and when any of the wake phrases are detected, send the interrupt and launch data streaming.

For a single device running multiple voice assistants, each voice assistant vendor requires using their own wake phrase algorithm such that once the VAD process detects speech, the on-device processor activates and runs multiple algorithms from different vendors in parallel to search for which wake phrase was issued by the user. This results in high MIPS and clock speed and as a consequence a higher power voice activation.

BRIEF SUMMARY

Systems and methods presented herein generally include multi-wake phrase detection executed on a single device utilizing multiple voice assistants. Systems and methods presented herein can further include continuously running a Voice Activity Detection (VAD) process which detects presence of human speech. The multi-wake phrase detection can activate when the VAD process detects human speech. Once activated, the multi-wake phrase detection can determine which (if any) of the wake phrases of the multiple voice assistants might be in the detected speech. Operation of the multi-wake phrase detection can have a low miss-rate. In some examples, operation of the multi-wake phrase detection can be granular to accomplish the low miss-rates at low power with a tolerance for false positives on wake phrase detection.

Systems and methods presented herein can further include activating an on-device processor to execute only algorithms from vendors associated with the wake phrases identified by the multi-wake phrase detection system as potentially stated in the detected speech. The multi-wake phrase detection can therefore reduce the number of vendor-specific wake phrase detection algorithms running in parallel compared to known systems which execute all wake phrase detection algorithms for each vendor-specific wake phrase following VAD detection of human speech.

Systems and methods presented herein can further include, once one or more wake phrases are detected by the vendor specific wake phrase detection algorithms, sending an interrupt to the rest of the system (i.e the application processor) for wake-up and launching data streaming to the cloud.

Preferably, the multi-wake phrase detection includes sufficient low miss rates such that when a wake phrase is stated, the on-device processor is activated with a high degree of probability to execute at least the algorithm associated with the stated wake phrase. As a trade-off, it is also preferable that the multi-wake phrase detection rules out a majority of the wake phrases to reduce the number of vendor-specific wake phrase detection algorithms executed in parallel by the on-device processor. Most preferably, the multi-wake phrase detection includes sufficient low miss rates as described while identifying only one (or none) of the wake phrases for a majority of VAD detections of speech.

An example system presented herein can include a multi-wake phrase detector configured to perform multi-wake phrase detection. The multi-wake phrase detector can be configured to be activated by the VAD to receive and process an audio signal. The multi-wake phrase detector can further be configured to select a subset of wake phrases among the wake phrases used by voice assistants on the example systems. The multi-wake phrase detector can be configured to provide instructions to the on-device processor to receive the audio signal and perform only voice recognition algorithms associated with the subset of wake phrases selected by the multi-wake phrase detector.

In some examples, the multi-wake phrase detector can include a classification neural network that is trained to detect one of the multiple wake phrases every time an utterance is spoken.

In some examples, the multi-wake phrase detector can support identification of up to about 64 wake phrases with a power consumption of about 200 microwatts.

In some examples, the multi-wake phrase detection can be trained to identify wake phrases with a low miss rate.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the several presently contemplated embodiments of low-power multi-voice assistants voice activation. This description is not intended to represent the only form in which the embodiments of the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

As used herein, an "audio signal" is understood to mean an electrical signal that is representative of a sound carried by acoustic waves. For instance, an "audio signal" can be an electrical signal provided by an acoustic transducer such as a microphone, an analogue electrical signal, a digital electrical signal, an analogue electrical signal that has been digitized, an electrical signal that has been amplified, an electrical signal that has been filtered, an electrical signal that has been sampled, and/or an electrical signal that has been decimated.

As used herein, an "audio stream" is understood to mean an "audio signal" that is continuously provided and/or generated. For instance, an "audio stream" can be an "audio signal" that is a real-time representation of acoustic waves impending on an acoustic transducer.

Figure 1:
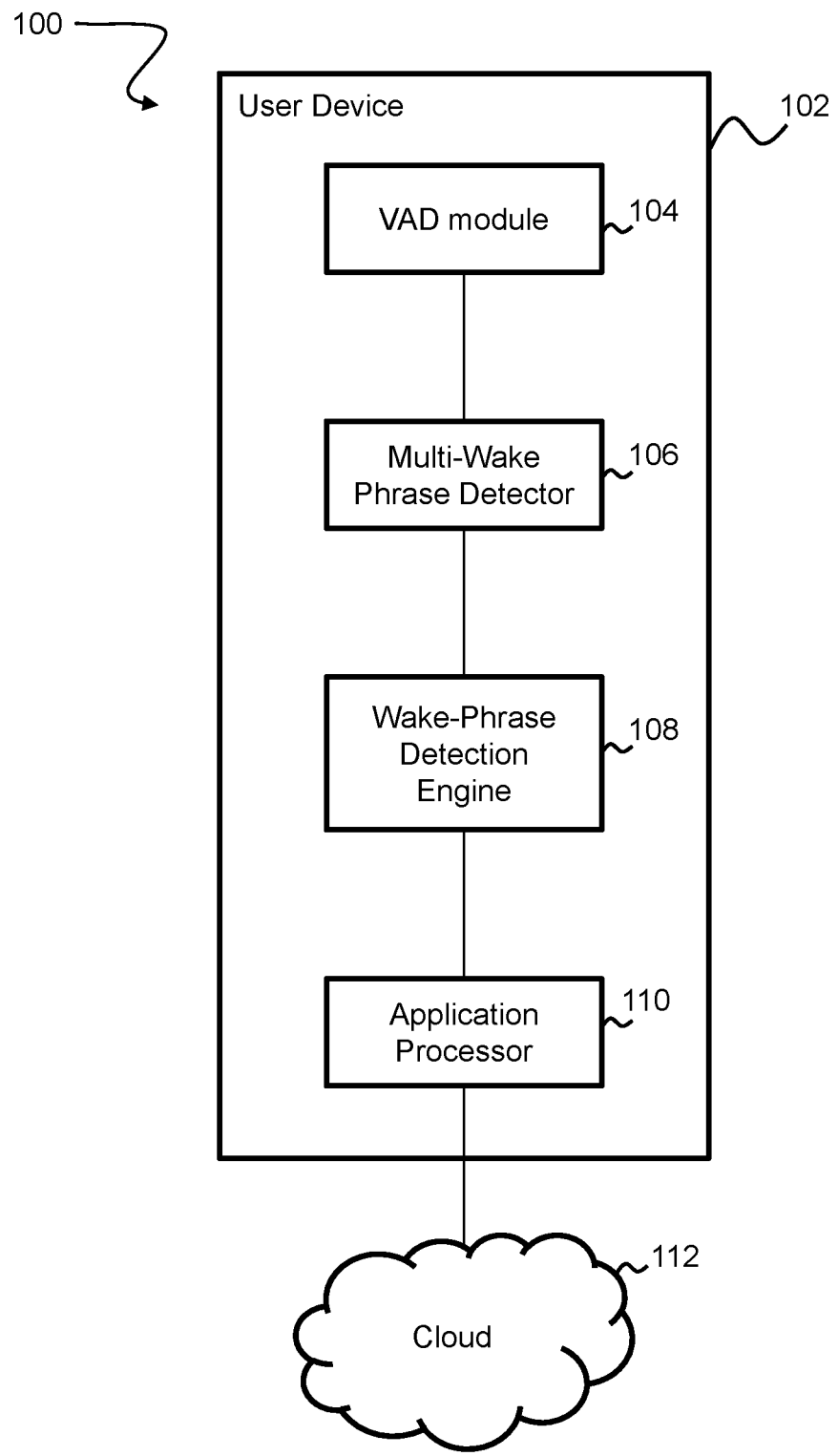
FIG. 1 illustrates an example system including a single user device running multiple voice assistants according to aspects of the present disclosure.

FIG. 1 illustrates an example system 100 including a single user device 102 running multiple voice assistants. The user device 102 can include a battery powered portable device, such as a smartwatch, a smartphone, a tablet computer, a remote controller, a computerized toy, and the like. Optionally, the user device 102 can be include a less-than portable computing device such as a desktop computer, home appliance, television, automobile, radio, intercom system, and the like.

The user device 102 can include a VAD (Voice Activity Detection) module 104, a multi-wake phrase detector 106, a wake phrase detection engine 108, and an application processor 110. The system 100 can further include a cloud network 112 in communication with the user device 102.

The VAD module 104 can be configured to detect presence of human speech. The VAD module 104 can be realized in hardware and/or software according to known techniques, variations thereof, alternatives thereto, and future implementations thereof as understood by a person of ordinary skill in the art according to the teachings herein. The VAD module 104 can be configured to receive an audio signal generated by an audio transducer (e.g. microphone) and transmit the audio signal to the multi-wake phrase detector when human voice is detected. The user device 100 can include the audio transducer, be adapted to receive the audio transducer (e.g. via an audio jack), and/or be configured to wirelessly receive the audio signal (e.g. via Bluetooth or other wireless protocol).

Various VAD techniques have been developed to provide different features. Each of the various VAD techniques include compromises, such as between latency, sensitivity, accuracy, and computational cost. Often the technique includes formulating a decision on a frame by frame basis using instantaneous measures of the divergence between the speech and the noise. There are many different divergence measures that may be used, such as for example, spectral slope, cepstral, correlation coefficients, weighted cepstral, log likelihood ratio, and modified distance measures.

In general, each of the VAD techniques detect the presence of human speech or the absence of human speech. One advantage of using the VAD based technique includes lowering the system power because the system, or parts thereof, is maintained in an idle mode until speech is detected. Another advantage of using the VAD based technique includes securing the user privacy by blocking sound streaming until speech is detected, after which it enables a second stage that checks whether the user is addressing the device with a wake phrase.

The multi-wake phrase detector 106 can be configured to receive audio signals from the VAD module 104 and categorize the audio signal based on likelihood of one of multiple wake phrases being represented in the audio signal. If the audio signal is categorized by the multi-wake phrase detector 106 to possibly include one or more of the multiple wake phrases, the multi-wake phrase detector 106 can further be configured to transmit the audio signal to the wake phrase detection engine 108 together with an indication of the possible wake phrases in the audio signal.

The multi-wake phrase detector 106 preferably includes a neural network topology. The neural network can be trained to recognize potential presence of multi-wake phrases by training for each phrase individually through methods and systems presently known, variations thereof, alternatives thereto, and future implementations thereof as understood by a person of ordinary skill in the art according to the teachings herein. The neural network is preferably a classification neural network. The neural network can include a one-to-one mapping of a classification a respective wake phrase of the wake phrases for which it is trained. For practical purposes, the total number of classifications can be on the order of the total number of unique wake phrases that a user may use to activate voice assistants. At the time of this writing, there are on the order of about ten wake phrases. As the use of voice assistants increases, the number of wake phrases can increase. In one example, the detector 106 can support up to 64 categories, and can be capable of categorizing up to 64 wake phrases. The example detector 106 can further be configured to perform categorization while consuming 200 microwatts of power.

The neural network topology can include a distribution of neurons (or processing nodes). The distribution of neurons may include a set of interconnections among the neurons. Through interconnections, nodes may receive data from other nodes (via incoming connections) or send data to other nodes (via outgoing connections). Interconnections may be assigned weights. The distribution of neurons may also be arranged in a set of multiple layers. Moreover, a subset or the entire set of weights of the neural network in the multi-wake phrase detector 206 may be reprogrammed. As a general matter, the multi-wake phrase detector 206 may include a fixed topology, such as the number of layers and the interconnections between the neurons, which are not reprogrammable in the customized circuit. Moreover, these limitations on the programmability of the multi-wake phrase detector 206 substantially decrease the power requirements while maintaining high accuracy for particularized applications, such as a limited voice and/or video recognition, by using a customized chip that is not substantially over-provisioned.

Preferably, the multi-wake phrase detector 106 is configured to categorize each wake phrase with sufficient low miss rates such that when a wake phrase is stated, the wake phrase detection engine 108 is activated with a high degree of probability to execute at least the algorithm associated with the stated wake phrase. As a trade-off, it is also preferable that the multi-wake phrase detector 106 rules out a majority of the wake phrases to reduce the number of vendor-specific wake phrase detection algorithms executed in parallel by the on-device processor. Most preferably, the multi-wake phrase detector 106 is configured to categorize each wake phrase with sufficient low miss rates as described while identifying only one (or none) of the wake phrases for a majority of VAD detections of speech.

The wake phrase detection engine 108 can include an on-device processor configured to execute vendor-specific algorithms to detect the presence of the associated wake phrase in the audio signal. Preferably, each vendor-specific algorithm detects the presence of the associated wake phrase with a lower false-positive result compared to categorization of the wake phrase by the multi-wake phrase detector 106. Additionally, or alternatively, the wake phrase detection engine 108 can include separate processors, neural networks, or other electronics, each configured to detect one of the vendor specific wake phrases. When a wake phrase is positively identified by the wake phrase detection engine 108, the wake phrase detection engine can be configured to transmit the audio signal and indication of the detected wake phrase to the application processor 110.

The application processor 110 can be configured to receive the audio signal and indication of detected wake phrase, and communicate the audio signal to the cloud 112 or other processing system.

The cloud 112 can include a processing system configured to recognize voice commands within the audio signal and return a response signal to the user device 102. The cloud 112 can be remotely networked as illustrated. The cloud 112 can include multiple, vendor-specific natural language processing systems. Additionally, or alternatively, the user device 102 can include one or more vendor-specific natural language processing systems thereon. At the time of this writing, typically, vendors perform natural language processing remotely at least in part due to electrical power consumption and computing resources necessary of those operations. However, as natural language processing continues to advance and be incorporated into electronics, performing natural language processing on the user device 102 can become more commonplace.

Figure 2:
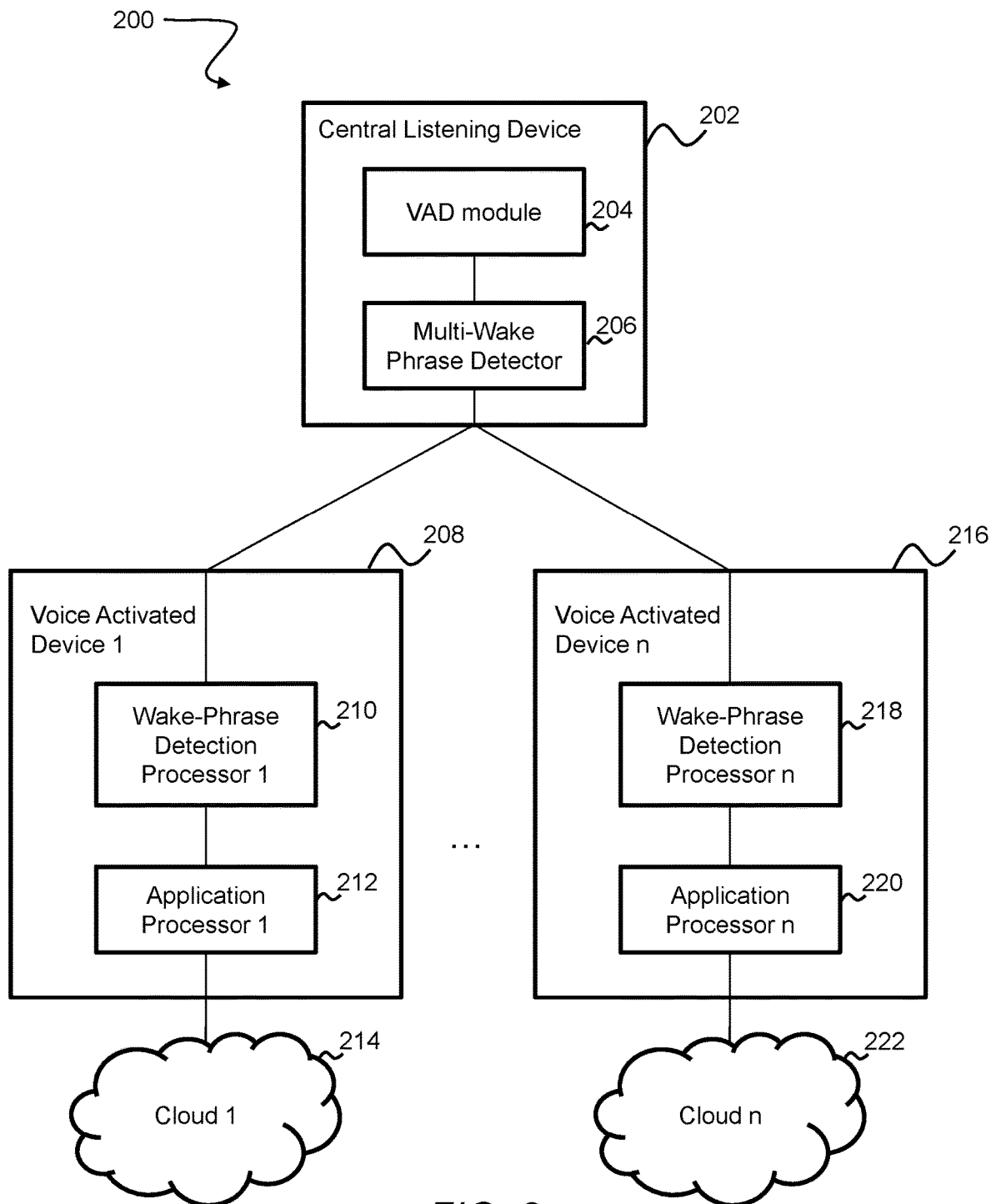
FIG. 2 illustrates an example system including a central listening device in communication with multiple vendor-specific devices each running a vendor-specific voice assistant according to aspects of the present disclosure.

FIG. 2 illustrates an example system 200 including a central listening device 202 in communication with multiple vendor-specific devices 208, 216 each running a vendor-specific voice assistant. The system 200 can further include vendor specific cloud networks 214, 222.

The central listening device 202 includes a VAD module 204 and a multi-wake phrase detector 206. The VAD module 204 can be configured to function as the VAD module 104 illustrated in FIG. 1 and otherwise implemented using hardware and/or software as described in relation to FIG. 1. The central listening device 202 can be configured to receive an audio signal by methods and structures described in relation to FIG. 1.

The multi-wake phrase detector 206 can receive the audio signal and categorize the audio signal as described in relation to the multi-wake phrase detector 106 illustrated in FIG. 1.

The central listening device 202 can include a battery powered portable device, such as a smartwatch, a smart wearable, a smartphone, a tablet computer, a remote controller, a computerized toy, and the like. Optionally, the user device 102 can be include a less-than portable computing device such as a desktop computer, home appliance, television, automobile, radio, intercom system, and the like.

Some or all of the vendor specific devices 208, 216 can be separate from the central listening device 202. Each vendor specific device 208, 216 can include a battery powered portable device, such as a smartwatch, a smartphone, a tablet computer, a remote controller, a computerized toy, and the like, and/or a less-than portable computing device such as a desktop computer, home appliance, television, automobile, radio, intercom system, and the like.

In one example, the central listening device 202 is included in a user's smartwatch while the user's smart phone includes the wake phrase detection processor 210 and application processor 212 of one of the voice activated devices 208. In another example, the central listening device 202 is a radio in the user's home and at least one of the vendor activated devices 208 is home appliance such as a dishwasher, security system, thermostat, etc.

The central listening device 202 can include transmitters and receivers to communicate with the voice activated devices 208, 216 via wired or wireless connection as understood by a person of ordinary skill in the art according to the teachings herein.

The vendor specific cloud networks 214, 222 can be respectively configured to perform language processing to recognize voice commands as described in relation to cloud 112 illustrated in FIG. 1.

Figure 3:
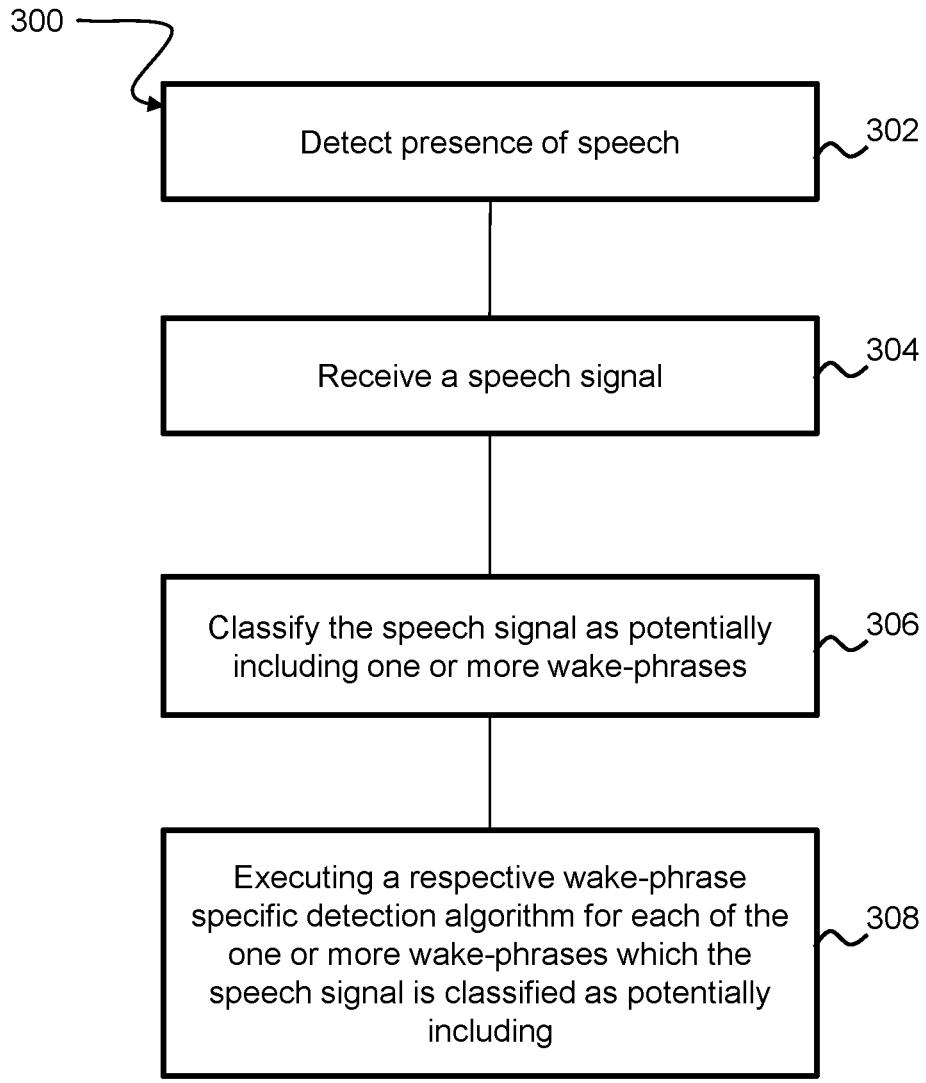
FIG. 3 illustrates a method including multi-wake phrase detection according to aspects of the present disclosure.

FIG. 3 illustrates a method 300 including multi-wake phrase detection.

At step 302, the presence of speech can be detected. The presence of speech can be detected with VAD as illustrated and described herein, a variation thereof, or an alternative thereto as understood by a person of ordinary skill in the art according to the teachings herein.

At step 304, a speech signal can be received. The speech signal can be received by a multi-wake phrase detector such as one of the multi-wake phrase detectors 106, 206 illustrated in FIG. 1 and FIG. 2, a multi-wake phrase detector as otherwise described herein, a variation thereof, or an alternative thereto as understood by a person of ordinary skill in the art according to the teachings herein.

At step 306, the speech signal can be classified as potentially including one or more wake phrases. The speech signal can be classified by the multi-wake phrase detector which received the speech signal at step 304.

At step 308, a respective wake phrase detection algorithm can be executed for each of the one or more wake phrases which the speech signal is classified as potentially including. The wake phrase detection algorithm can be executed by a wake phrase detection engine 108 such as illustrated in FIG. 1, a voice activated device 208 as illustrated in FIG. 2, a variation thereof of either, or an alternative thereto of either as understood by a person of ordinary skill in the art according to the teachings herein.

Each system described herein may be implemented using a computer-readable medium that may be any available medium that may be accessed by a processor. The computer-readable medium may include both a volatile and a nonvolatile medium, a removable and non-removable medium, and a storage medium. The storage medium may include RAM, flash memory, ROM, erasable programmable read-only memory (EPROM), electrically erasable programmable read-only memory (EEPROM), registers, hard disk, a removable disk, a compact disk read-only memory (CD-ROM), or any other form of storage medium. The processor may be operatively coupled via a bus to a display, such as a Liquid Crystal Display (LCD). The display may display information to the user. A keyboard and a cursor control device, such as a touch screen, can also be operatively coupled to bus to enable the user to interface with the system.

The processor may be operatively coupled via the bus to one or more databases. The database may store data in an integrated collection of logically-related records or files. The database may be an operational database, an analytical database, a data warehouse, a distributed database, an end-user database, an external database, a navigational database, an in-memory database, a document-oriented database, a real-time database, a relational database, an object-oriented database, a NoSQL database, or any other database, or any combination thereof.

The memory may store software modules that provide functionality when executed in combination with the processor. The modules can include a data visualization module. The data visualization module may include a data visualization application that can collect, organize, synchronize, and display case data. The data visualization module may comprise a plurality of modules that each provide specific individual functionality for collecting, organizing, synchronizing, entering, modifying, and displaying data. The memory may also store an operating system. The operating system may provide operating system functionality for the system. The memory may also store one or more additional applications to include additional functionality for an overall system.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention. Project type configurations may be created automatically by the system or by the user of the system through an interface. The resulting project types may result in outputs suitable for use in the data models and the workflow models.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A multi-wake word/phrase detector configured to:
   activate upon detection of human speech in an audio signal;
   receive the audio signal;
   analyze the audio signal to identify a presence of one specific wake word/phrase from a plurality of potential wake words/phrases;
   activate an on-device processor configured to execute a vendor-specific wake word/phrase detection algorithm upon identifying the presence of the one specific wake word/phrase for the vendor, without a simultaneous activation of wake word/phrase detection algorithms for other vendors unassociated with the specific wake word/phrase; and
   transmit an interrupt to activate an application processor to initiate streaming of the audio signal to a remote processor for further processing.

2. The multi-wake word/phrase detector of claim 1 further configured to return to an idle mode after the audio signal and the indicator are transmitted.

3. The multi-wake word/phrase detector of claim 1, wherein the analysis of the audio signal is performed by a multi-class classification neural network trained to recognize the presence of the specific wake word/phrase from the plurality of potential wake words/phrases.

4. The multi-wake word/phrase detector of claim 3, wherein the multi-class classification neural network includes a one-to-one mapping of a classification to a given one of the plurality of potential wake words/phrases for which the multi-class classification neural network is trained.

5. The multi-wake word/phrase detector of claim 4, wherein the classification corresponds to one of a plurality of voice assistants.

6. The multi-wake word/phrase detector of claim 3, wherein the multi-class classification neural network has a fixed topology.

7. A system comprising:
   a voice activity detector configured to transmit audio signals including human speech;
   a multi-wake word/phrase detector configured to receive the audio signals from the voice activity detector, analyze the audio signal to identify a presence of one specific wake word/phrase from a plurality of potential wake words/phrases;
   a multi-wake word/phrase detection engine configured to receive the audio signal from the multi-wake word/phrase detector, to execute, on the audio signal, a vendor-specific wake word/phrase detection algorithm upon identifying the presence of the one specific wake word/phrase for the vendor indicated by the multi-wake word/phrase detector, without a simultaneous activation of wake word/phrase detection algorithms for other vendors unassociated with the specific wake word/phrase
   an application processor configured to activate in response to an interrupt from the multi-wake word/phrase detection engine upon the identification of the specific wake word/phrase and initiated streaming of the audio signal to a remote processor for natural language recognition.

8. The system of claim 7, wherein the multi-wake word/phrase detector is implemented with a multi-class classification neural network including a one-to-one mapping of a classification to a given one of the plurality of potential wake words/phrases for which the multi-class classification neural network is trained.

9. The system of claim 8, wherein the multi-class classification neural network has a fixed topology.

10. The system of claim 7, wherein the voice activity detector maintains at least the multi-wake word/phrase detector, the multi-wake word/phrase detection engine, and the application processor in an idle mode.

11. The system of claim 7, wherein the multi-wake word/phrase detection engine includes an on-device processor configured to execute one of multiple detection algorithms each specific to a voice assistant.

12. The system of claim 11, further comprising:
a central listening device incorporating the voice activity detector, and the multi-wake word/phrase detector.

13. The system of claim 7, further comprising:
one or more peripheral voice activated devices each including a dedicated wake word/phrase detection processor in communication with the multi-wake word/phrase detector, each of the peripheral voice activated devices being associated with a specific one of the wake word/phrase detection algorithms.

14. The system of claim 13, wherein at least one of the peripheral voice activated devices is battery-powered.

15. The system of claim 7, wherein the application processor transmits the audio signal to a cloud processing system.

16. A method comprising:
detecting human speech in an audio signal;
analyzing the audio signal to identify a presence of one specific wake word/phrase from a plurality of potential wake words/phrases;
activating an on-device processor configured to execute a vendor-specific wake word/phrase detection algorithm upon identifying the presence of the one specific wake word/phrase for the vendor, without a simultaneous activation of wake word/phrase detection algorithms for other vendors unassociated with the specific wake word/phrase; and
generating an interrupt to activate an application processor to initiate streaming of the audio signal to a remote processor for further processing.

17. The method of claim 16, further comprising:
executing, on the audio signal, only wake word/phrase detection algorithm(s) associated with the one or more wake words/phrases indicated by the indicator;
identifying a spoken wake word/phrase of the plurality of wake words/phrases;
activating an application processor upon the identification of the spoken wake word/phrase; and
transmitting the audio signal for natural language recognition.

18. The method of claim 16, wherein the categorizing of the audio signal is performed by a multi-class classification neural network trained to recognize the potential presence of one or more wake words/phrases.

19. The method of claim 18, wherein the multi-class classification neural network includes a one-to-one mapping of a classification to a given one of the plurality of potential wake words/phrases for which the multi-class classification neural network is trained.

20. The method of claim 18, wherein the multi-class classification neural network has a fixed topology.

* * * * *